(12) United States Patent
Howie et al.

(10) Patent No.: US 10,288,153 B2
(45) Date of Patent: May 14, 2019

(54) CABLE-OPERATED SLIDE-OUT ACTUATOR

(71) Applicant: LIPPERT COMPONENTS, INC., Elkhart, IN (US)

(72) Inventors: Mark Howie, Edwardsburg, MI (US); Jeffrey K. Albrecht, Goshen, IN (US); Evan Whitney, Edwardsburg, MI (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 55 days.

(21) Appl. No.: 15/334,959

(22) Filed: Oct. 26, 2016

(65) Prior Publication Data

US 2017/0114877 A1    Apr. 27, 2017

Related U.S. Application Data

(60) Provisional application No. 62/246,880, filed on Oct. 27, 2015.

(51) Int. Cl.
*F16H 19/06* (2006.01)
*B60P 3/34* (2006.01)

(52) U.S. Cl.
CPC ............ *F16H 19/0618* (2013.01); *B60P 3/34* (2013.01); *F16H 2019/0668* (2013.01)

(58) Field of Classification Search
CPC ................................ F16H 19/0618; B60P 3/34
USPC ....................................................... 296/26.13
See application file for complete search history.

(56) References Cited

U.S. PATENT DOCUMENTS

| | | | |
|---|---|---|---|
| 2,855,240 A | 10/1958 | Toland | |
| 4,103,462 A | 8/1978 | Freller | |
| 5,332,276 A | 7/1994 | Blodgett, Jr. | |
| 6,254,171 B1 | 7/2001 | Young, Sr. | |
| 6,623,066 B2 * | 9/2003 | Garceau | B60P 3/34 296/165 |
| 6,644,719 B2 | 11/2003 | Young, Sr. | |
| 7,040,689 B2 * | 5/2006 | Few | B60P 3/34 296/165 |
| 7,073,844 B2 | 7/2006 | Garceau et al. | |
| 7,210,269 B2 | 5/2007 | Garceau et al. | |
| 7,309,092 B2 | 12/2007 | Garceau et al. | |
| 7,354,088 B2 | 4/2008 | Garceau et al. | |
| 8,042,853 B2 | 10/2011 | Garceau | |
| 2004/0145204 A1 | 7/2004 | Few et al. | |

(Continued)

FOREIGN PATENT DOCUMENTS

WO    WO 02/20309    3/2002

OTHER PUBLICATIONS

Int'l Search Report and Written Opinion issued in App. No. PCT/US2016/058991 (dated 2017).

*Primary Examiner* — Joseph D. Pape

(74) *Attorney, Agent, or Firm* — Nixon & Vanderhye P.C.

(57) ABSTRACT

A cable-operated mechanism for actuating a slide-out room includes a column, an endless chain loop disposed with the column, first and second drive blocks engaged with the chain loop, and first through fourth cables attached at first ends thereof to the drive blocks. The cables are attached at second ends thereof to inboard and outboard ends of a slide out room. Operation of the chain loop in a first direction tensions the cables attached to the inboard end of the room and slackens the cables attached to the outboard end. Operation of the chain loop in a second direction has the opposite effect.

18 Claims, 9 Drawing Sheets

(56) References Cited

U.S. PATENT DOCUMENTS

2007/0164580 A1 7/2007 Peter
2015/0040700 A1 2/2015 Walls

* cited by examiner

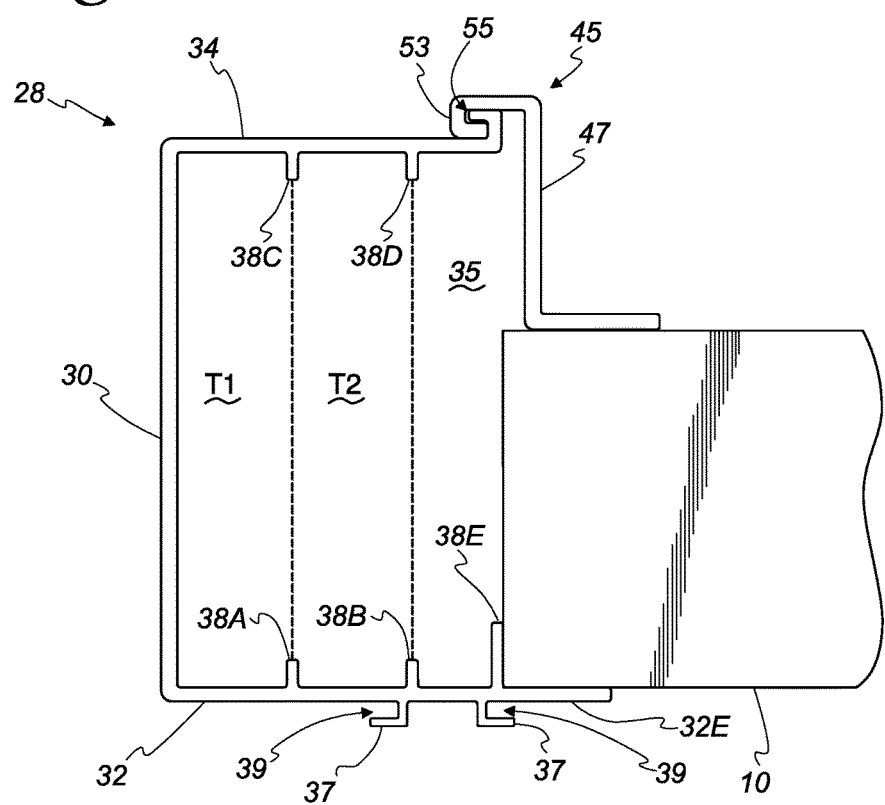

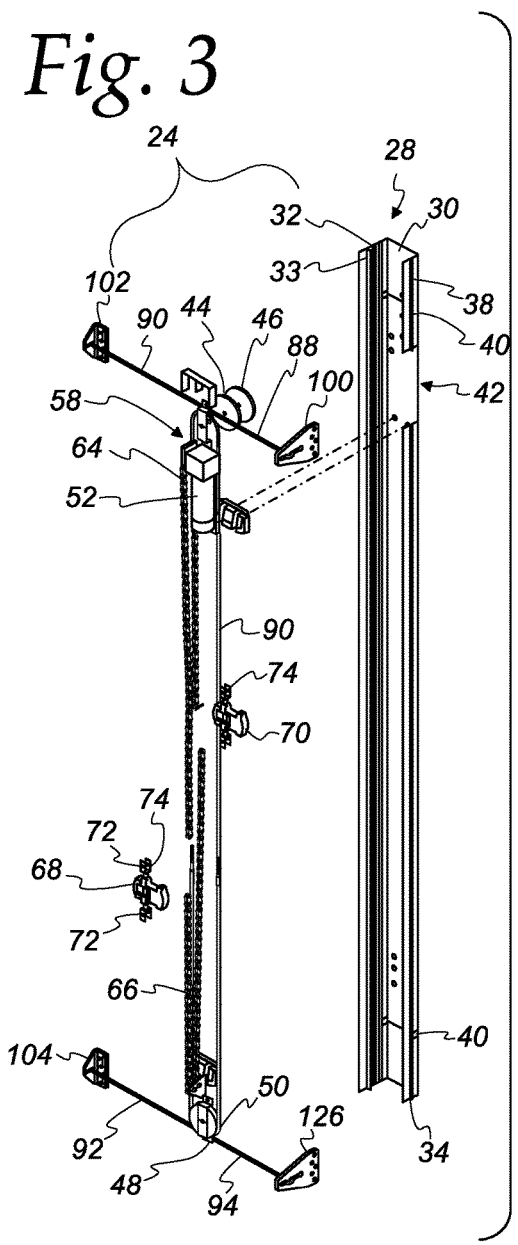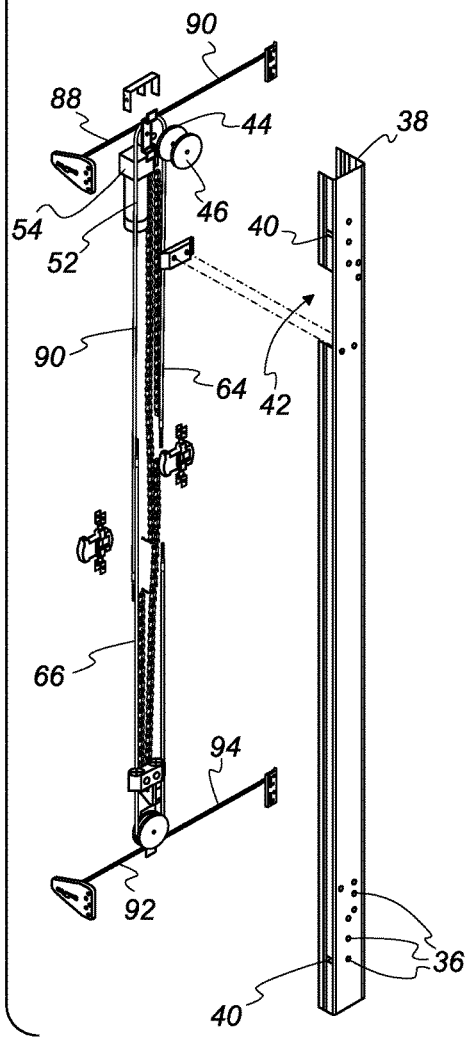

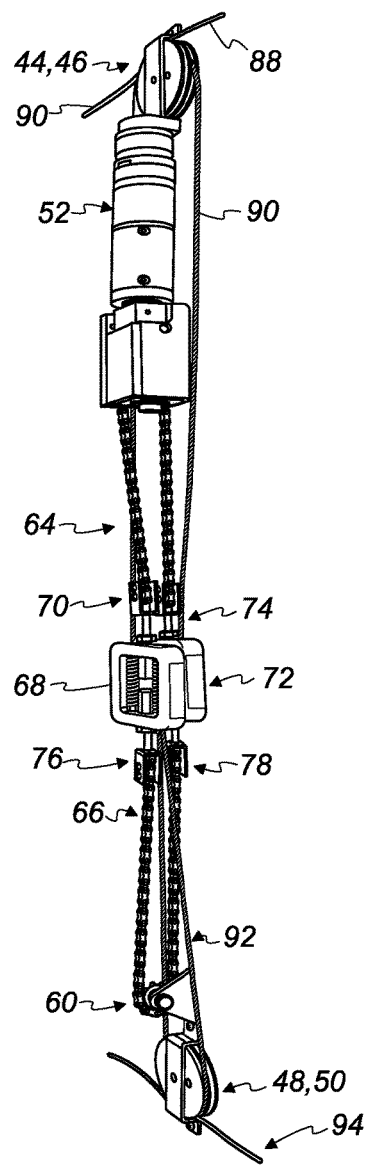
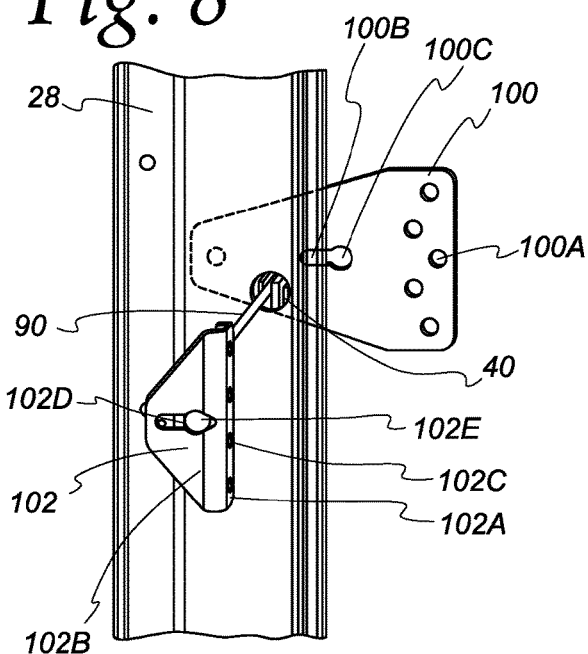

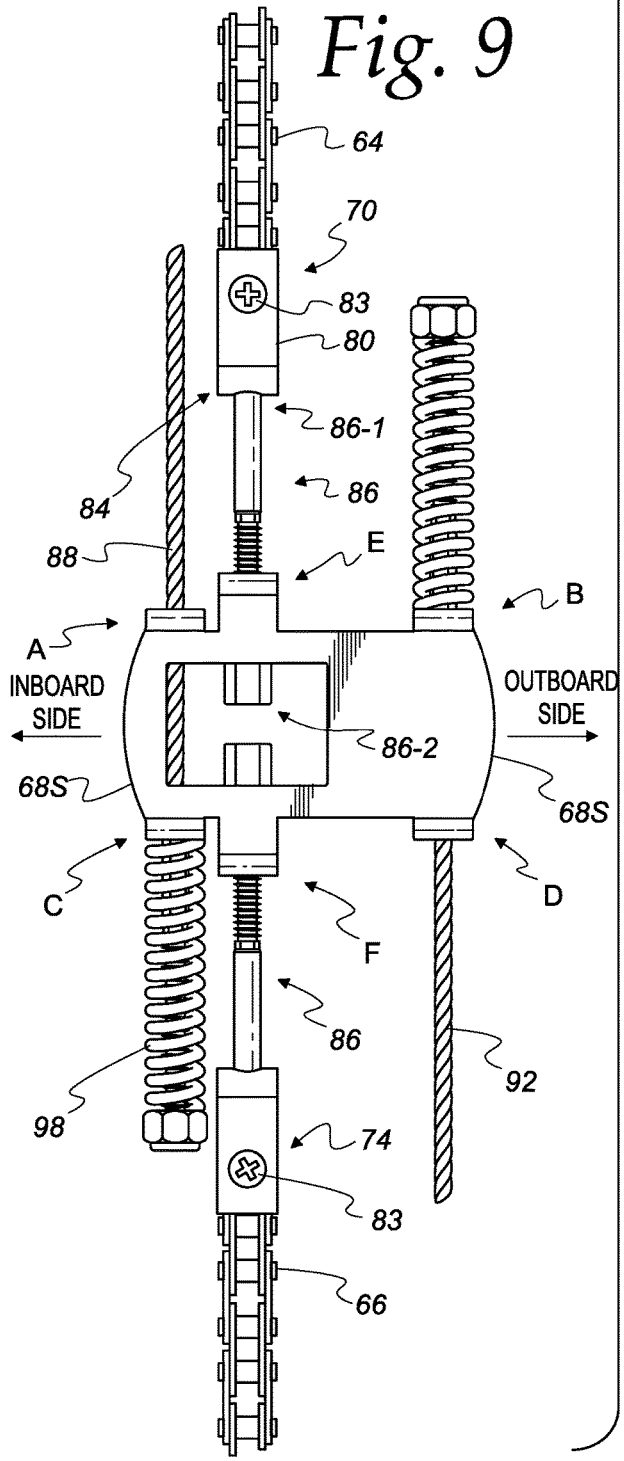
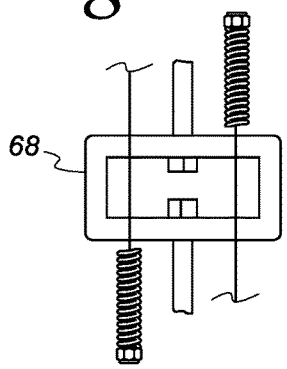
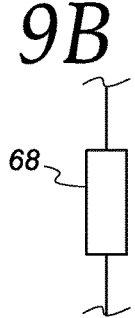
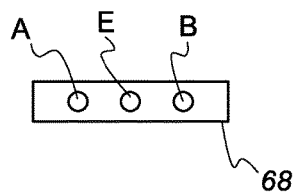

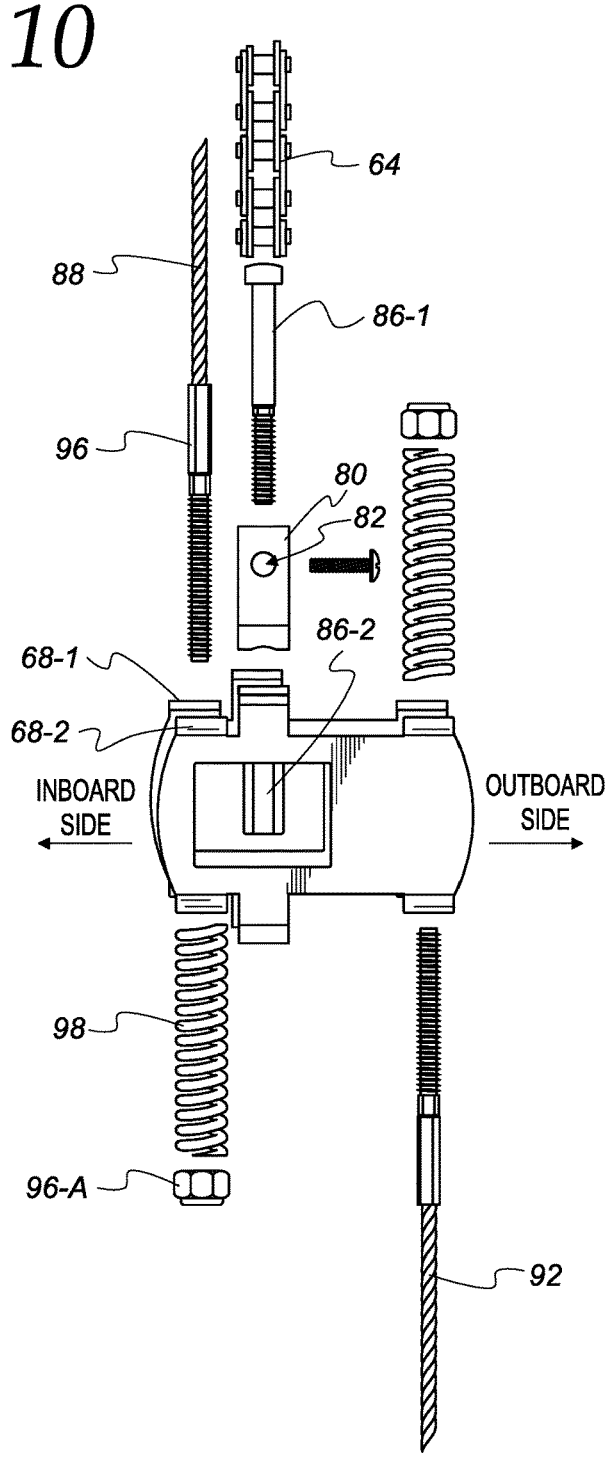

ial Patent
CABLE-OPERATED SLIDE-OUT ACTUATOR

CROSS REFERENCE TO RELATED APPLICATION

This application claims benefit of U.S. Provisional Patent Application No. 62/246,880, filed on Oct. 27, 2015, and incorporates herein by reference the disclosure thereof in its entirety.

BACKGROUND AND SUMMARY OF THE DISCLOSURE

The present disclosure is directed to an actuator for a slide-out compartment configured to slide through an opening in a wall of structure, for example, a slide-out room of a recreational vehicle (RV).

BRIEF DESCRIPTION OF THE DRAWINGS

FIG. 2C is another end view of a column, drive blocks, and a cover of an actuator according to the present disclosure attached to a wall;

FIG. 3 is a partially-exploded inner perspective view of an actuator according to the present disclosure;

FIG. 4 is a partially-exploded outer perspective view of an actuator according to the present disclosure;

FIG. 7 is a perspective view of internals of an actuator according to the present disclosure;

FIG. 8 is a perspective detail view of a portion of an actuator according to the present disclosure showing a column enclosing certain actuator components, drive cables extending from the housing through apertures in sides thereof, and brackets for connecting drive cables to inner and outer portions of a slide-out room;

FIG. 9 is a front elevation view of a drive block, a drive chain, and cables according to the present disclosure;

FIGS. 9A-9C are front, side, and top views, respectively, of an alternative drive block according to the present disclosure;

FIG. 10 is an exploded front elevation view of a drive block, a drive chain, and cables according to the present disclosure.

DETAILED DESCRIPTION OF THE DRAWINGS

Terms of orientation, for example, upper, lower, right, left, inboard, outboard, and the like, as may be used herein should be construed as referring to relative orientation, and not absolute orientation, unless context dictates otherwise.

Figure 1A:
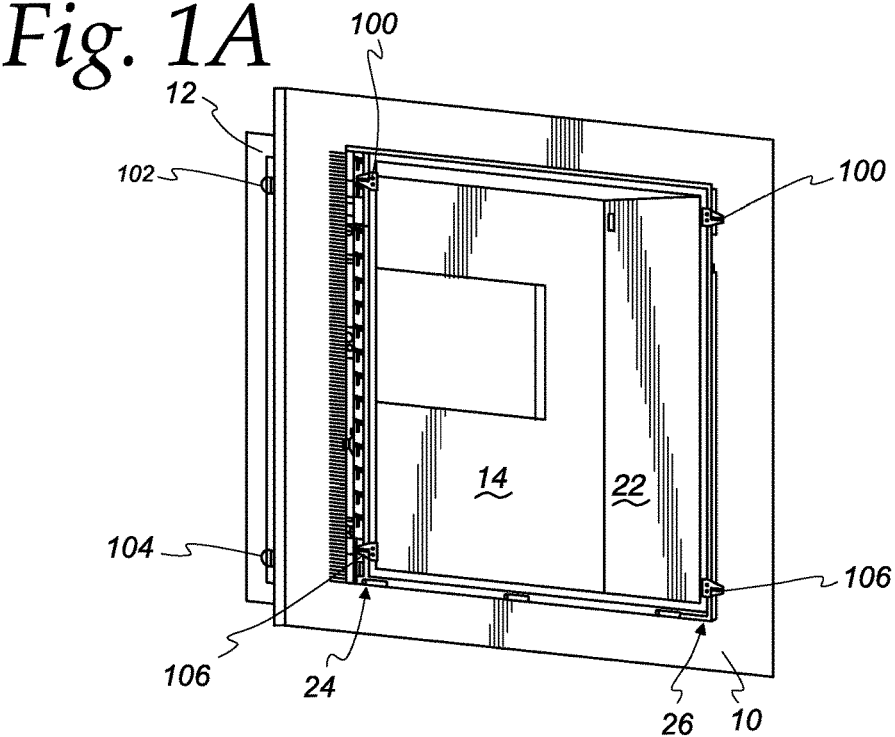
FIG. 1A is a perspective view of a slide-out compartment installed in an opening in a wall of a structure according to the present disclosure, with the slide-out compartment in an extended position.
Figure 1B:
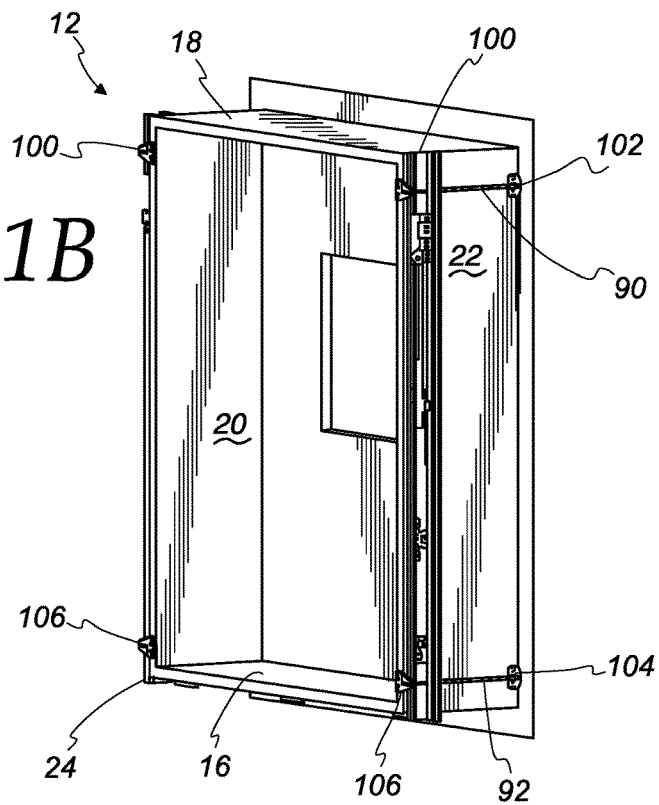
FIG. 1B is a perspective view of a slide-out compartment installed in an opening in a wall of a structure according to the present disclosure, with the slide-out compartment in an extended position and with the wall not shown for clarity.

FIGS. 1A and 1B show a sidewall 10 of a structure, for example, a sidewall of an RV, and a slide-out compartment 12, for example, a slide-out room, that is extendable and retractable through an opening in the side wall of the structure. The slide-out room 12 includes an outer wall 14, a floor 16, a ceiling 18, and first and second sidewalls 20, 22. FIG. 1A shows the slide-out room 12 in a first (or extended) position with respect to the sidewall 10 of the RV, wherein the outer wall 14 of the slide-out room is spaced from the sidewall 10 of the RV, and wherein the interior space defined by the floor 16, ceiling 18, and walls 14, 20, 22 of the slide-out room is generally outboard of the sidewall 10 of the RV. FIG. 1B shows the slide-out room in the extended position with the sidewall 10 removed for clarity. The slide-out room 12 may be moved to a second (or retracted) position wherein the outer wall 14 of the slide-out room generally abuts the sidewall 10 of the RV, and wherein the interior space defined by the slide-out room 12 is generally inboard of the sidewall 10 of the RV.

FIGS. 1A and 1B also show a first actuator 24 connected between the sidewall of the RV and the first sidewall of the slide-out room, and a second actuator 26 similarly connected between the sidewall of the RV and the second sidewall of the slide-out room. More specifically, FIGS. 1A and 1B show respective columns, as will be discussed further below, of the first and second actuators 24, 26 attached to the wall 10 of the RV adjacent left and right sides of the opening therein, and corresponding cables attached to inner and outer ends of the slide-out room by corresponding brackets 100, 102, 104, 106. The first and second actuators 24, 26 may be identical to or mirror images of each other. As such, only the first actuator 24 will be described in detail herein.

Figure 2A:
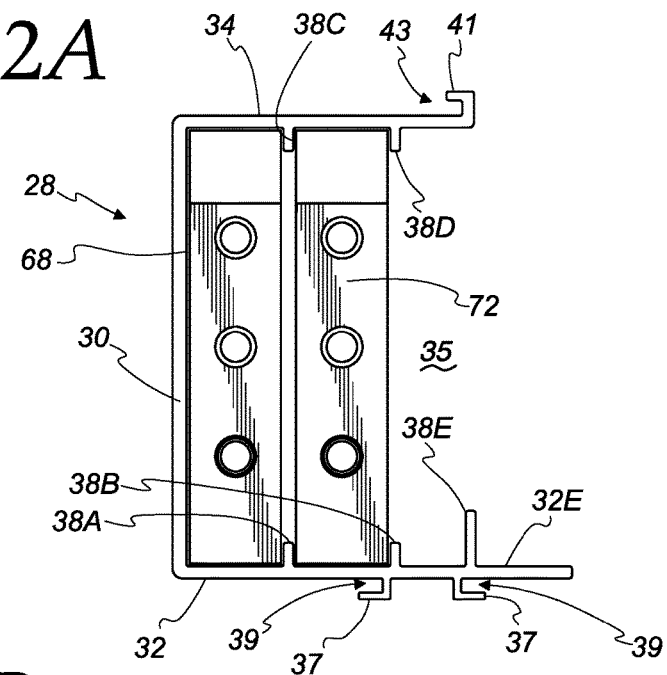
FIG. 2A is an end view of a column and drive blocks of an actuator according to the present disclosure.
Figure 2B:
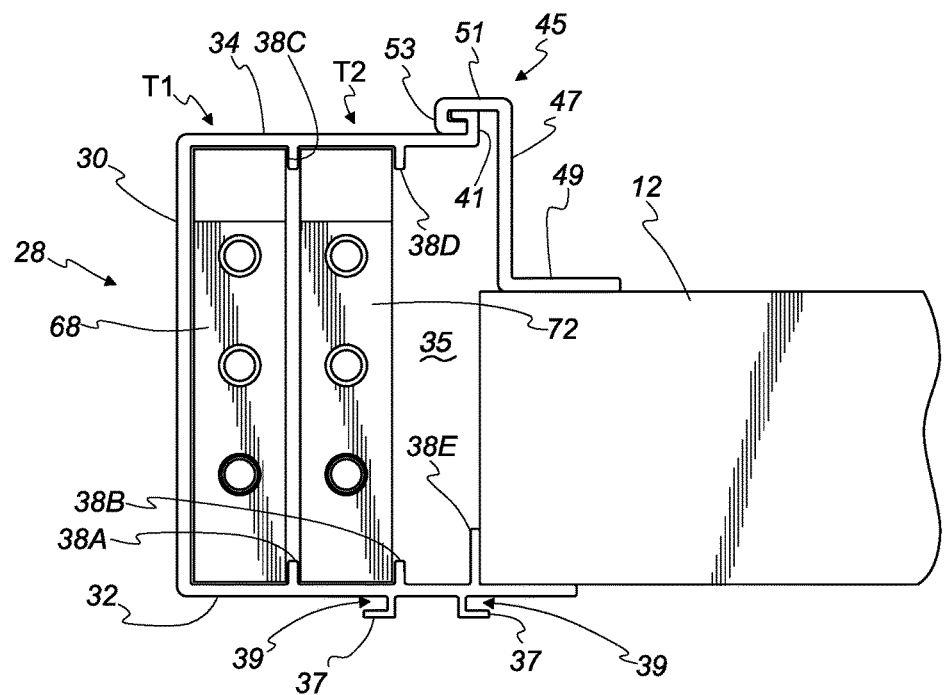
FIG. 2B is an end view of a column, drive blocks, and a cover of an actuator according to the present disclosure attached to a wall.
Figure 5:
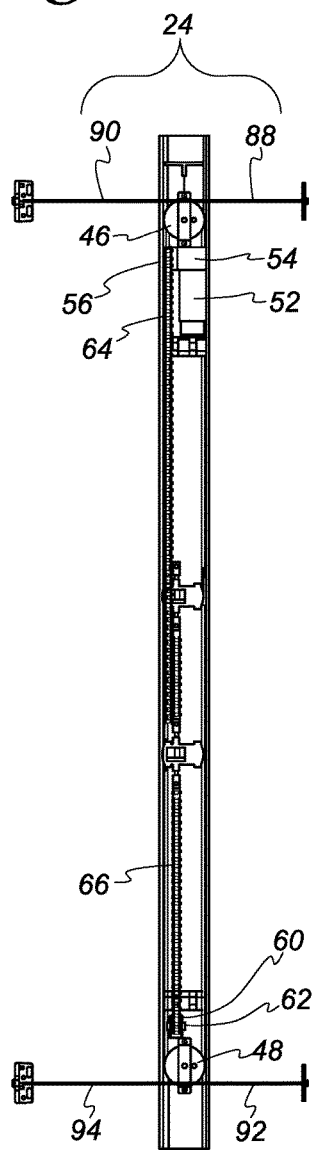
FIG. 5 is a side elevation view of an actuator according to the present disclosure.
Figure 6:
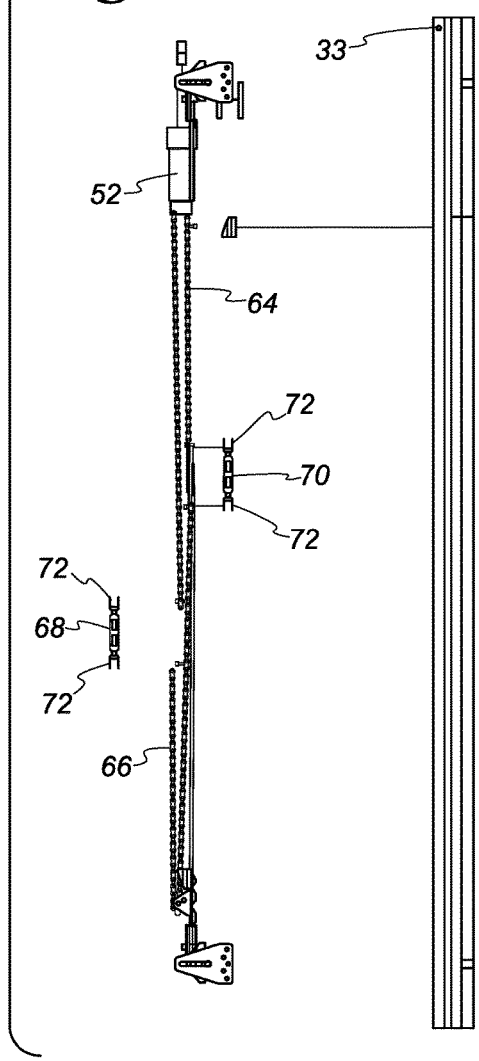
FIG. 6 is a partially-exploded front elevation view of an actuator according to the present disclosure.
Figure 11:
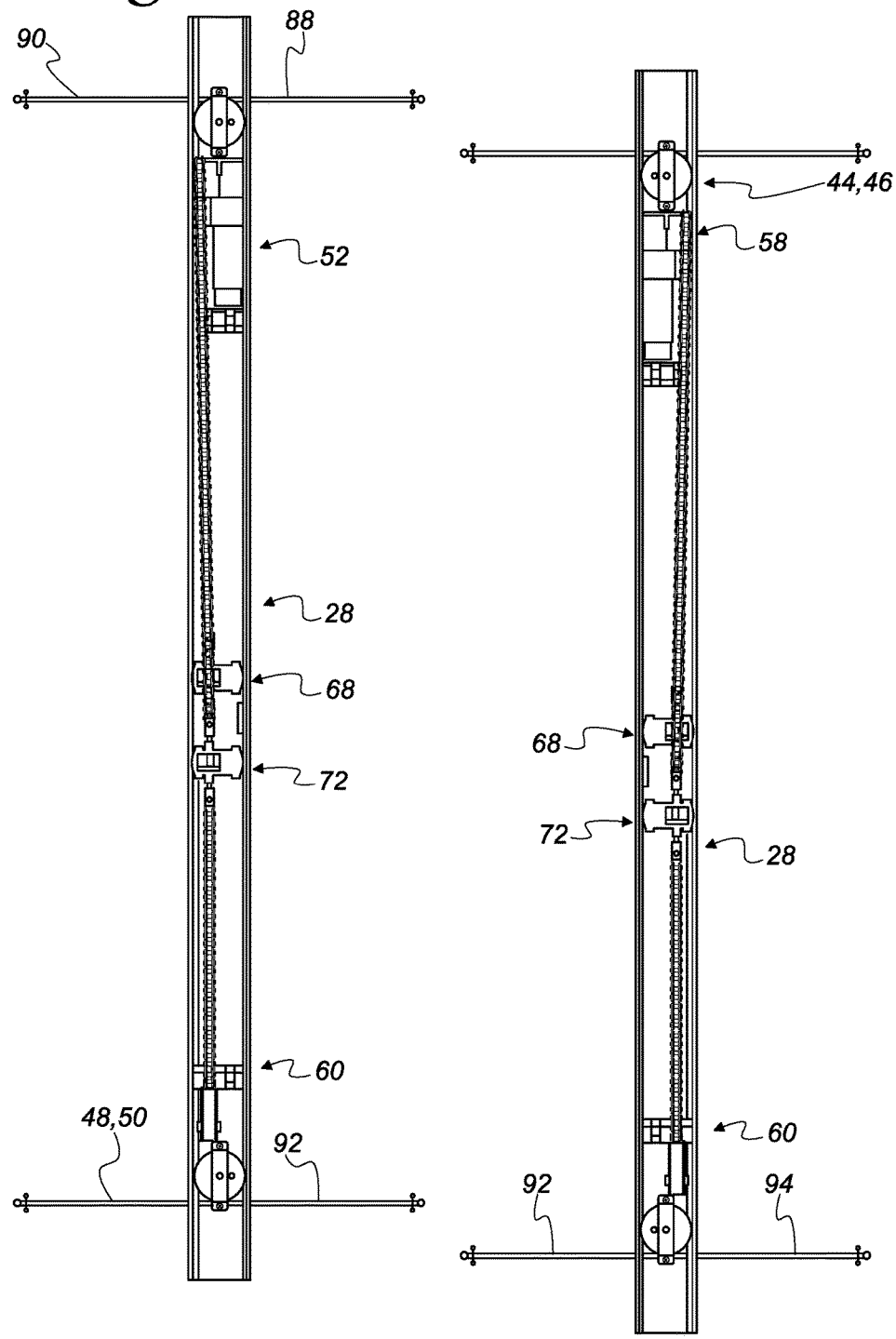
FIG. 11 is a side-by-side view of first and second actuators according to the present disclosure.

As best shown in FIGS. 2A and 2B, the first actuator 24 includes an elongated, generally U-shaped channel or column 28 configured for attachment to the sidewall of the RV. More specifically, the column 28 includes a generally planar web 30 and first and second parallel flanges 32, 34 extending in the same direction from opposite edges of the web. The web 30 and first and second flanges 32, 34 cooperate to define an interior region 35 of the column 28.

The web 30 may define one or more apertures 36 that may be configured to receive mechanical fasteners (not shown) that might be used to secure brackets or other components of the first actuator 24 to the web 30, as will be discussed further below.

The first flange 32 may include first and second elongated ribs 38A, 38B extending perpendicularly there from toward the second flange 34, into the interior region 35 of the column 28. The second flange 34 may include third and fourth elongated ribs 38C, 38D extending perpendicularly there from toward the first flange 32, into the interior region 35 of the column 28. The web 30, the first rib 38A, and the third rib 38C cooperate to define a first track T1 configured to slidingly receive a first drive block 68, as will be discussed further below. The first rib 38A, the second rib 38B, the third rib 38C, and the fourth rib 38D cooperate to define a second track T2 configured to slidingly receive a second drive block 72, as will be discussed further below. The first flange 32 may include an end portion 32E. A locating rib 38E may extend from the first flange 32 generally perpendicular there from toward the second flange 34. The end portion 32E of the first flange 32 and the locating rib 38E cooperate to define a notch configured to receive a corner of the wall 10 in generally abutting engagement, as will be discussed further below. The end portion 32E of the first flange 32 may define one or more apertures 33 extending there through and configured to receive fasteners (not shown) that may be used to secure the first flange 32 to the wall 10.

The first flange 32 may include one or more elongated hook-shaped sections 37 extending from an outer surface thereof, that is, a surface opposite the interior region 35 of the column 28. The hook-shaped sections 37 cooperate with the first flange 32 to define tab-receiving slots 39. The hook-shaped sections 37 and/or the tab-receiving slots 39 may be configured to receive mating mounting tabs of a corresponding seal (not shown) or other structure.

The second flange 34 may include an elongated hook-shaped section 41 extending outwardly from the second flange. The hook-shaped section 41 and the second flange 34 cooperate to define a tab-receiving slot 43. The hook-shaped sections 37 and/or the tab-receiving slot 43 may be configured to receive a mating tab of a corresponding elongated cover 45.

As shown in FIGS. 2B and 2C, the cover 45 includes a web 47, a first flange 49 extending from a first side of the web proximate a first edge thereof, and a second flange 51 extending from a second side of the web opposite the first side of the web, proximate a second edge thereof. Each of the first flange 49 and the second flange 51 extends generally perpendicularly from the web 47. As such, the first second flanges 49, 51 are spaced apart, generally parallel to each other, and extend in opposite directions from the web 47.

An elongated hook-shaped section 53 extends from the free end of the second flange 51. The hook-shaped section 53 and the second flange 51 cooperate to define a slot 55 having an opening facing the web 47. The slot 55 is configured to receive the free end of the hook-shaped section 41 of the second flange 34 of the column 28. Similarly, the slot 43 of the column 28 is configured to receive the free end of the hook-shaped member 53 of the cover 45.

As best shown in FIGS. 2B and 2C, the hook-shaped section 53 and slot 55 of the cover 45 may be interlocked with the hook-shaped section 41 and slot 43 of the column 28, and the first flange 49 of the cover may be placed in or near abutment with the wall 10. The first flange 49 of the cover may define one or more apertures (not shown) configured to receive fasteners (not shown) that may be used to secure the cover to the wall 10.

The first and second flanges 32, 34 of the column 28 may define one or more apertures 40 for receiving cables there through, as will be discussed further below. As best shown in FIGS. 3 and 4, one or more portions 42 of either or both of the first and second flanges 32, 34 may be cut away to provide access to the interior region 35 of the column 28 there through. Such access may facilitate removal and/or installation of a motor and/or other components while the column 28 is attached to the wall 10, as will be discussed further below.

The column 28 may be attached to the wall 10 by butting the end portion 32E of the column 28 against the outer surface of the wall 10 adjacent the opening there through and butting the locating rib 38E against the edge of the wall 10 defining the opening, so that the wall is engaged with the notch defined by the end portion 32E and the locating rib 38E. The column may be fastened to the wall 10 using fasteners (not shown) extending through the end portion 32E into the wall 10. The cover 45 may be interlocked with the column 28 as discussed above, and the cover may be fastened to the wall 10 using fasteners extending through the first flange 49 of the cover and into the wall.

As best shown in FIGS. 3-6 and 11, first and second cable guides 44, 46 may be disposed in the interior region 35 of the column 28 and attached to the column near an upper end thereof. Each of the first and second cable guides 44, 46 could be embodied as a discrete pulley. Alternatively, the first and second cable guides 44, 46 could be embodied as a single pulley having two sheaves. As a further alternative, the first and second cable guides 44, 46 could be embodied as a single roller. In an embodiment, the first and second cable guides 44, 46 could be embodied as curved, static guides. Such guides could be made of or lined with a lubricious material to facilitate sliding of cables therein, as will become apparent from the discussion below. The first and second cable guides 44, 46 could be embodied in other forms, as well. The first and second cable guides 44, 46 are configured to redirect corresponding cables from a direction generally parallel to the length of the column 28 to a direction generally perpendicular to the first and second flanges 32, 34 thereof, as will be discussed further below.

Third and fourth cable guides 48, 50 may be disposed in the interior region 35 of the column 28 and attached to the column near a lower end thereof. The third and fourth cable guides 48, 50 can take any of the forms described for the first and second cable guides 44, 46 and may be similarly configured.

FIGS. 3 and 4 show the first and second cable guides 44, 46 in an exploded view, offset from their corresponding cables, as will be discussed further below. FIGS. 3 and 4 show the third and fourth cable guides 48, 50 closely adjacent to or abutting each other and engaged with their corresponding cables, as will be discussed further below. In a typical embodiment, the first and second cable guides 44, 46 would similarly be closely adjacent to or abutting each other and engaged with their corresponding cables.

A bi-directional motor 52 may be attached to the column 28 near the upper end thereof. The motor 52 is shown as being inboard of the first and second cable guides 44, 46. That is, the first and second cable guides 44, 46 are shown as being located between the upper end of the column 28 and the motor 52. In an embodiment, the motor 52 could be outboard of the first and second cable guides 44, 46. That is, the motor 52 could be located between the upper end of the column and the first and second cable guides 44, 46. Alternatively, the motor 52 could be similarly located near the lower end of the column 28, inboard or outboard of the third and fourth cable guides 48, 50. In an embodiment, the motor 52 could be disposed in a central region of the column 28.

In the illustrated embodiment, the motor 52 has an output shaft (not shown) extending parallel to the column 28. The output shaft of the motor 52 is engaged with and drives a right angle drive mechanism 54 having a drive shaft 56 perpendicular to the output shaft of the motor 52. A first toothed sprocket 58 (which may be referred to herein as the drive sprocket) is attached to the drive shaft 56 for rotation therewith. The drive shaft 56 is generally perpendicular to the first and second flanges 32, 34 of the column 28. As such, the first sprocket 58 is generally parallel to the first and second flanges 32, 34. In an embodiment, the motor 52 could be configured with its output shaft generally perpendicular to the first and second flanges 32, 34 of the column 28. In such an embodiment, the right angle drive mechanism 54 could be omitted. In such an embodiment, the output shaft of the motor 52 could serve as the drive shaft 56.

A second toothed sprocket 60 (which may be referred to herein as the idler sprocket) is attached to an idler sprocket shaft 62. The idler sprocket shaft 62, in turn, is attached to the column 28 near the lower end thereof (or near the upper thereof if the motor is attached near the lower end thereof). The idler sprocket shaft 62 is generally parallel to the drive shaft 56. As such, the idler sprocket 60 is generally parallel to the drive sprocket 58. The idler sprocket 60 and motor sprocket 58 may be, but need not be, coplanar.

A first length of drive chain 64 having a first end, a second end, and an intermediate portion has its intermediate portion engaged with the drive sprocket 58. A second length of chain 66 having a first end, a second end, and an intermediate portion has its intermediate portion engaged with the idler sprocket 60.

The first end of the first length of drive chain 64 is attached to a first drive block 68 by a first turnbuckle 70. The second end of the first length of drive chain 64 is attached to a second drive block 72 by a second turnbuckle 74. The first end of the second length of drive chain 66 is attached to the second drive block 72 by a third turnbuckle 76. The second end of the second length of drive chain 66 is attached to the first drive block 68 by a fourth turnbuckle 78. As such, the first length of drive chain 64, the first drive block 68, the second length of drive chain 66, the second drive block 70 and the turnbuckles 70, 74, 76, 78 cooperate to form an endless drive chain or drive loop.

The first and second drive blocks 68, 72 may be identical to or mirror images of each other. As such, the structure of only the first drive block 68 will be discussed in detail herein.

The first drive block 68 is shown in FIGS. 9 and 10 as including first and second members 68-1 and 68-2, each having a generally planar body portion having first and second opposing ends and first and second opposing sides. The body portion defines a tool-receiving aperture, as will be discussed further below. A first tab or cable receiver A has a first portion that extends laterally from the first side proximate the first end. A second tab or cable receiver B has a first portion that extends laterally from the first side proximate the second end. A third tab or cable receiver C has a first portion that extends laterally from the second side proximate the first end. A fourth tab or cable receiver D has a first portion that extends laterally from the second side proximate the second end. A fifth tab or chain end receiver E has a first portion that extends laterally from the first side proximate the first tab. A sixth tab or chain end receiver has a first portion that extends laterally from the second side proximate the third tab. Each of the first through sixth tabs has a second portion extending in the same direction substantially perpendicular to the corresponding first portion. The second portion of each of the first through sixth tabs defines an aperture. The first and second members 68-1, 68-2 of the first drive block 68 may be mirror images of each other. In use, the second portions of the first through sixth tabs of the first and second members 68-1, 68-2 are oriented facing each other, with the apertures defined by corresponding ones thereof coaxially aligned.

The outer side portions 68S of the first and second drive blocks 68, 72 may be configured for sliding engagement in the first and second tracks T1, T2 defined by the column 28 without binding therein.

In an embodiment, as shown in FIGS. 9A-9C, each of the first and second drive blocks 68, 72 could instead be embodied as unitary structure defining apertures corresponding to the first through fourth cable receivers A, B, C, D and the first and second chain end receivers E, F. In such an embodiment, the respective drive blocks 68, 72 could be made of metal or a polymeric material, for example, DEL-RIN® plastic. The embodiments shown in FIGS. 9A-9C are generally rectangular but could have rounded corners or rounded side portions similar to side portions 68S to facilitate sliding within the first track T1 without binding therein.

The turnbuckles 70, 74, 76, 78 are configured to attach the first and second lengths of drive chain 64, 66 to the first and second drive blocks 68, 72 and to adjust the length of the endless loop defined by these components. The turnbuckles 70, 74, 76, 78 may be identical to each other. As such, only the first turnbuckle 70 will be described in detail herein.

As shown, the first turnbuckle 70 includes a chain link receiver 80 in the form of a U-shaped channel having a web and first and second generally parallel and spaced apart flanges extending in a first direction from the web. Each of the first and second flanges defines a pin-receiving aperture 82. The first and second flanges are configured to receive a link of the first drive chain 64 there between. With the link so received, a fastener 83 may be inserted through the apertures 82 and between the side plates and adjacent rollers of a link of the first length of drive chain 64 to attach the link to the chain link receiver 80. Alternatively, a pin (not shown) may be inserted through the apertures 82 and a roller in a link, for example, the end link of the first drive chain.

The web of the chain link receiver 80 defines an aperture 84 configured to receive in rotating but not threaded engagement an adjuster 86 in the form of a bolt, machine screw, or other threaded member 86-1 having a head and a shank, and a mating nut 86-2. As best shown in FIG. 10, the adjuster 86 may be embodied as a carriage bolt having its shank received through the aperture 84 in the web of the chain link receiver 80 and its head received between the first and second flanges of the chain link receiver 80 in substantially non-rotating engagement. The threaded end of the carriage bolt is best shown in FIG. 9 as being inserted through the respective apertures of the fifth tabs of the first and second members 68-1, 68-2 of the first drive member 68. The nut of the adjuster 86 is threadedly attached to the threaded portion of the shank of the carriage bolt.

The first drive block 68 may be connected to the second length of drive chain 66 via the second turnbuckle 74 in a similar manner. Also, the second drive block 72 may be connected to the first and second lengths of drive chain 64, 66 via the third and fourth turnbuckles 76, 78 in a similar manner. With the first and second lengths of drive chain 64, 66 assembled to the first and second drive blocks 68, 72 in this manner, the adjusters 86 of the first through fourth turnbuckles 70, 74, 76, 78 may be used to lengthen and shorten the foregoing endless drive chain or drive loop by turning the carriage bolt thereof relative to the nut thereof.

In an embodiment, the foregoing length adjustment feature could be eliminated and each chain link receiver could be fixedly attached to the respective drive block.

The first drive block 68 also is configured to be attached to respective first ends of first and third cables 88, 92. For example, a threaded fitting 96 may be crimped onto or otherwise secured to a first end of the first cable 88. The threaded fitting 96 may be inserted through the respective apertures of the second portions of the first and third tabs of the first and second members 68-1, 68-2 of the first drive member 68. A corresponding nut 96A may be fitted to the threaded fitting 96 to preclude the free end of the threaded fitting from being withdrawn through the foregoing apertures of the first drive block, thereby securing the first cable 88 to the first drive block. The nut may be rotated with respect to the threaded fitting 96 to effectively adjust the length of the first cable 88. In other embodiments, other means may be used to secure the first cable end to the first drive block. A spring 98, for example, a helical compression spring, may be installed between the nut and the first drive block to facilitate cable length adjustment and/or to provide compliance when the actuator is operated, as will become evident from the discussion below.

Similarly, the third cable 92 may be connected to the first drive block 68 via corresponding apertures in the second portions of the third and fourth tabs of the first and second members 68-1, 68-1 of the first drive block 68 in a similar manner. Also, the second cable 90 may be connected to the second drive block 72 via corresponding apertures in analogous second portions of analogous third and fourth tabs of the first and second members of the second drive block 72. Further, the fourth cable 94 may be connected to the second drive block 72 via corresponding apertures in analogous second portions of analogous first and second tabs of the second members of the second drive block 72.

The first cable 88 extends from its point of attachment to the first drive block 68, around the first cable guide 44, and through an aperture 40 in the side of the column 28 to a first room attachment bracket 100. As such, a portion of the first cable 88 runs vertically through an upper portion of the inboard side of the column 28 and exits the column horizontally through the aperture 40. The first room attachment bracket 100 is attached to an upper, outboard end of the slide-out room 12.

The first room attachment bracket 100 is configured as a planar bracket define one or more apertures 100A for receiving screws or other mechanical fasteners (not shown) that may be used to attach the first room attachment bracket 100 to the slide-out room 12. The first attachment bracket further defines a slot 100B having an enlarged opening 100C at an end thereof. A button head or the like may be provided at the free end of the first cable 88 to facilitate attachment of the first cable to the first cable attachment bracket 100 within the slot 100B through the opening 100C.

The second cable 90 extends from its point of attachment to the second drive block 72, around the second cable guide 46, and through another aperture 40 in the side of the column 28 to a second room attachment bracket 102. As such, a portion of the second cable 90 runs vertically through an upper portion of the outboard side of the column 28 and exits the column horizontally through the corresponding aperture 40. The second room attachment bracket 102 is attached to an upper, inboard end of the slide-out room 12.

The second room attachment bracket 102 is configured as a right-angled bracket having a first leg 102A attachable to a portion of a sidewall of the slide out room 12 and a second leg 102B perpendicular to the first leg. The first leg 100A may define one or more apertures 102C for receiving screws or other mechanical fasteners (not shown) that may be used to attach the first room attachment bracket 100 to the slide-out room 12. The second leg 100B defines a slot 100D having an enlarged opening 100E at an end thereof. A button head or the like may be provided at the free end of the second cable 90 to facilitate attachment of the first cable to the second cable attachment bracket 102 within the slot 100D through the opening 100E.

In other embodiments, the second room attachment bracket 102 may be configured in a manner the same as or similar to the first room attachment bracket 100, and vice versa, or the brackets could be configured in other manners.

The third cable 92 extends from its point of attachment to the first drive block 68, around the third cable guide 48, and through yet another aperture 40 in the side of the column 28 to a third room attachment bracket 104. As such, a portion of the third cable 92 runs vertically through a lower portion of the outboard side of the column 28 and exits the column horizontally through the corresponding aperture 40. The third room attachment bracket 104 is attached to a lower, inboard end of the slide-out room 12. The third room attachment bracket 104 may be configured in a manner the same as or similar to the first or second room attachment bracket 100, 102.

The fourth cable 94 extends from its point of attachment to the second drive block 70, around the fourth cable guide 50, and through still another aperture 40 in the side of the column 28 to a fourth room attachment bracket 106. As such, a portion of the fourth cable 94 runs vertically through a lower portion of the inboard side of the column 28 and exits the column horizontally through the corresponding aperture 40. The fourth room attachment bracket 106 is attached to a lower, outboard end of the slide-out room 12. The fourth room attachment bracket 106 may be configured in a manner the same as or similar to the first or second room attachment bracket 100, 102.

In operation, the motor 52 may be operated in a first direction, causing the drive sprocket 58 to rotate in a corresponding first direction. The rotation of the drive sprocket 58 in the first direction causes the endless loop formed by the first and second lengths of drive chain 64, 66 and the first and second drive blocks 68, 72 to revolve in the first direction. As such, the first drive block 68 moves in a first linear, for example, downward, direction and the second drive block 72 moves in a second linear, for example, upward direction.

Because the first and third cables 88, 92 are attached to the first drive block 68, the first ends thereof also move in the first linear, for example, downward direction. Because the second and fourth cables 90, 94 are attached to the second drive block 72, the first ends thereof also move in the second linear, for example, upward direction. Consequently, the first and fourth cables 88, 94 are tensioned to pull the slide-out room 12 from the outboard position to the inboard position and the second and third cables 90, 92 are slackened or relaxed. Operating the motor 52 in the opposite direction results in the opposite effect. The configuration of the first and second drive blocks 68, 72 within the corresponding tracks T1, T2 precludes the first and second drive blocks from colliding with other during such operation.

The invention claimed is:

1. An actuator for operating a slide-out compartment slidably installed in an opening in a wall of a structure, the slide out compartment having an inboard end and an outboard end, each of said inboard end and outboard end having an upper portion and a lower portion, the actuator comprising:
   an elongated U-shaped column;
   a bi-directional drive motor attached to the column, the motor including a selectively rotatable motor shaft extending therefrom;
   a first toothed sprocket attached to said motor shaft;
   a second toothed sprocket spaced from said first toothed sprocket and rotatably attached to said column;
   a first drive block;
   a second drive block;
   a first chain having a first end attached to said first drive block, a second end attached to said second drive block, and an intermediate portion between said first end and said second end, said intermediate portion engaged with said first sprocket;
   a second chain having a first end attached to said second guide block, a second end attached to said first drive block, and an intermediate portion between said first end and said second end, said intermediate portion engaged with said second sprocket, said first chain, said first drive block, said second chain, and said second drive block forming an endless drive loop;

a first cable guide;

a second cable guide;

a third cable guide;

a fourth cable guide;

a first cable having a first end attached to said first drive block and a second end attachable to said outboard end of said compartment, said first cable engagable with said first cable guide;

a second cable having a first end attached to said second drive block and a second end attachable to said inboard end of said compartment, said second cable engagable with said second cable guide;

a third cable having a first end attached to said first drive block and a second end attachable to said inboard end of said compartment, said third cable engagable with said third cable guide; and a fourth cable having a first end attached to said second drive block and a second end attachable to said outboard end of said compartment, said fourth cable engagable with said fourth cable guide.

2. The actuator of claim 1 wherein at least one of said first through fourth cable guides comprises a pulley.

3. The actuator of claim 1 wherein said first and second cable guides comprise a first pulley, said first pulley having a first sheave receiving said first cable and a second sheave receiving said second cable.

4. The actuator of claim 3 wherein said third and fourth cable guides comprise a second pulley, said second pulley having a first sheave receiving said third cable and a second sheave receiving said fourth cable.

5. The actuator of claim 1, said column defining a first track and a second track parallel to and spaced from said first track, said first drive block slidingly received in said first track and said second drive block slidingly received in said second track, said first track, said second track, said first drive block, and said second drive block configured to permit said first drive block to slide past said second drive block without colliding with said second drive block.

6. The actuator of claim 1, said column defining an elongated mounting flange configured for attachment to said wall of said structure.

7. The actuator of claim 6, said column further defining a locating rib configured for abutment with said wall of said structure.

8. The actuator of claim 1, said column defining an elongated hook-shaped section, said actuator further comprising an elongated cover, said cover defining an elongated hook-shaped section engagable with said elongated hook-shaped section of said column and an elongated flange configured for attachment to said wall of said structure.

9. The actuator of claim 1, said endless drive loop further comprising a drive loop length adjuster, said drive loop length adjuster connecting one of said first chain and said second chain to one of said first drive block and said second drive block.

10. The actuator of claim 1 further comprising a cable tensioner connecting one of said first cable, said second cable, said third cable, and said fourth cable to a corresponding one of said first drive block and said second drive block.

11. The actuator of claim 1 in combination with said slide-out compartment, said second end of said first cable attached to said upper portion of said outboard end of said slide-out compartment, said second end of said second cable attached to said upper portion of said inboard end of said slide-out compartment, said second end of said third cable attached to said lower portion of said inboard end of said slide-out compartment, and said second end of said fourth cable attached to said lower portion of said outboard end of said slide-out compartment.

12. The combination of claim 11, wherein operation of said bi-directional motor in a first direction of rotation results in translation of said first drive block, said first end of said first cable, and said first end of said third cable in a first direction, translation of said second end of said first cable and said second end of said third cable in a second direction, translation of said second drive block, said first end of said second cable, and said first end of said fourth cable in a third direction generally opposite said first direction, and translation of said second end of said second cable and said second end of said fourth cable in said second direction; and wherein operation of said bi-directional motor in a second direction of rotation results in translation of said first drive block, said first end of said first cable, and said first end of said third cable in said third direction, translation of said second end of said first cable and said second end of said third cable in a fourth direction, translation of said second drive block, said first end of said second cable, and said first end of said fourth cable in said first direction, and translation of said second end of said second cable and said second end of said fourth cable in said fourth direction.

13. The combination of claim 12 wherein said second direction is generally perpendicular to said first direction and said fourth direction is generally perpendicular to said third direction.

14. The combination of claim 13 wherein said second direction is generally opposite said fourth direction.

15. The combination of claim 11 in combination with the structure, wherein operation of said bi-directional motor in said first direction of rotation results in translation of said slide-out compartment in an outboard direction with respect to said structure and wherein operation of said bi-directional motor in said second direction of rotation results in translation of said slide-out compartment in an inboard direction with respect to said structure.

16. The combination of claim 15, said column defining an elongated mounting flange attached to said wall of said structure.

17. The combination of claim 16, the column further defining an elongated locating rib in abutment with said wall of said structure.

18. The combination of claim 16 further comprising an elongated cover defining an elongated hook-shaped section and an elongated flange, said column further defining an elongated hook-shaped section, said hook-shaped section of said cover engaged with said hook-shaped section of said column, said flange of said cover attached to said wall of said structure.

* * * * *